US012746820B2

(12) United States Patent
Tatekawa et al.

(10) Patent No.: US 12,746,820 B2
(45) Date of Patent: Sep. 29, 2026

(54) INPUT DEVICE

(71) Applicant: ALPS ALPINE CO., LTD., Tokyo (JP)

(72) Inventors: Tsutomu Tatekawa, Miyagi (JP); Shinichi Sagawai, Miyagi (JP); Yoshihiro Hashimoto, Unterschleissheim (DE); Yuto Fujii, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 19/309,930

(22) Filed: Aug. 26, 2025

(65) Prior Publication Data

US 2025/0388080 A1 Dec. 25, 2025

Related U.S. Application Data

(63) Continuation of application No. PCT/JP2024/007526, filed on Feb. 29, 2024.

(30) Foreign Application Priority Data

Mar. 27, 2023 (JP) ................................ 2023-050163

(51) Int. Cl.
*B60K 35/25* (2024.01)
*B60K 35/10* (2024.01)
*B62D 1/04* (2006.01)

(52) U.S. Cl.
CPC ................ *B60K 35/10* (2024.01); *B62D 1/04* (2013.01); *B60K 2360/782* (2024.01)

(58) Field of Classification Search
CPC ........ B60K 35/10; B60K 35/00; B60K 35/25; B60K 35/60; B60K 2360/782; B62D 1/04;
(Continued)

(56) References Cited

U.S. PATENT DOCUMENTS 9,751,534 B2 * 9/2017 Fung ...................... G06V 10/82
10,444,117 B2 * 10/2019 Akiyama ............... G05B 13/02
(Continued)

FOREIGN PATENT DOCUMENTS

CN 111625088 9/2020
CN 112959946 6/2021
(Continued)

OTHER PUBLICATIONS

International Search Report for PCT/JP2024/007526 mailed on May 21, 2024.

*Primary Examiner* — Olga V Merkoulova
(74) *Attorney, Agent, or Firm* — IPUSA, PLLC

(57) ABSTRACT

An input device includes a touch input part installed on a steering wheel of a vehicle and supported so as to be able to vibrate, a detection part to detect an input operation to the touch input part, a vibration output part to vibrate the touch input part, and a controller to drive the vibration output part, wherein when the input operation is detected by the detection part, the controller causes vibration of the touch input part by driving the vibration output part with a first signal, a vibration transmission member is provided on a vibration transmission path from the touch input part to the steering wheel, and the first signal drives the vibration output part at a frequency in a vibration damping region where a resonance multiplying factor of a vibration system provided on the vibration transmission path is less than zero.

7 Claims, 11 Drawing Sheets

(58) Field of Classification Search
CPC ..... B62D 1/046; G06F 3/016; G06F 3/03547; H01H 13/00; H01H 36/00
See application file for complete search history.

(56) References Cited

U.S. PATENT DOCUMENTS

| | | | | |
|---|---|---|---|---|
| 11,909,339 | B2 * | 2/2024 | Masui | H02P 23/04 |
| 2008/0174415 | A1 | 7/2008 | Tanida et al. | |
| 2016/0001781 | A1 * | 1/2016 | Fung | G06V 10/82 701/36 |
| 2017/0220197 | A1 * | 8/2017 | Matsumoto | G06F 3/016 |
| 2019/0219481 | A1 * | 7/2019 | Akiyama | G05B 13/04 |
| 2020/0398884 | A1 | 12/2020 | Katsuyama et al. | |
| 2022/0055482 | A1 * | 2/2022 | Brissman | B62D 1/046 |
| 2023/0123719 | A1 | 4/2023 | Taniguchi et al. | |

FOREIGN PATENT DOCUMENTS

| | | |
|---|---|---|
| JP | 2008-171383 | 7/2008 |
| JP | 2012-103852 | 5/2012 |
| JP | 2018-060368 | 4/2018 |
| JP | 2019-053962 | 4/2019 |
| JP | 2021-166135 | 10/2021 |

* cited by examiner

INPUT DEVICE

CROSS-REFERENCE TO RELATED APPLICATION

This application is a continuation application of International Application no. PCT/JP2024/007526, filed on Feb. 29, 2024, and designated the U.S., which is based upon and claims priority to Japanese Patent Application no. 2023-050163 filed on Mar. 27, 2023, the entire contents of which are incorporated herein by reference.

TECHNICAL FIELD

The disclosures herein relate to input devices.

BACKGROUND ART

Patent Literature (PTL) 1 discloses a technology in which, under a predetermined condition, a piezo element provided in a switch disposed on a steering wheel is caused to vibrate so that the vibration is transmitted to a driver's hand gripping the steering wheel.

However, in the related technology, when an operator operates a touch input part with the operator's finger in a state of gripping the steering wheel with the operator's palm, if the vibration is merely increased in strength, the vibration is transmitted to the steering wheel, causing the steering wheel and the touch input part to vibrate integrally. Therefore, there has been a problem that the operator's palm can feel the vibration but the operator's fingers cannot appreciably feel the vibration. Moreover, in the related technology, even if the vibration is merely decreased in strength, the operator's fingers cannot appreciably feel the vibration.

CITATION LIST

Patent Literature

[PTL 1] Japanese Laid-Open Patent publication no. 2019-053962

SUMMARY OF THE INVENTION

An input device includes a touch input part steering wheel of a vehicle and installed on a supported so as to be able to vibrate, a detection part configured to detect an input operation to the touch input part, a vibration output part configured to vibrate the touch input part, and a controller configured the vibration output part, wherein when the input operation is detected by the detection part, the controller is configured to cause vibration of the touch input part by driving the vibration output part with a first signal, a vibration transmission member is provided on a vibration transmission path from the touch input part to the steering wheel, and the first signal is configured to drive the vibration output part at a frequency in a vibration damping region where a resonance multiplying factor of a vibration system provided on the vibration transmission path is less than zero.

According to the input device of one embodiment, the vibration of the touch input part can be easily felt with fingertips by making the vibration less transmitted to the steering wheel as necessary.

DESCRIPTION OF THE PREFERRED EMBODIMENTS

In the following, embodiments of the present invention will be described with reference to the accompanying drawings.

(Configuration of Steering Device 10)

Figure 1:
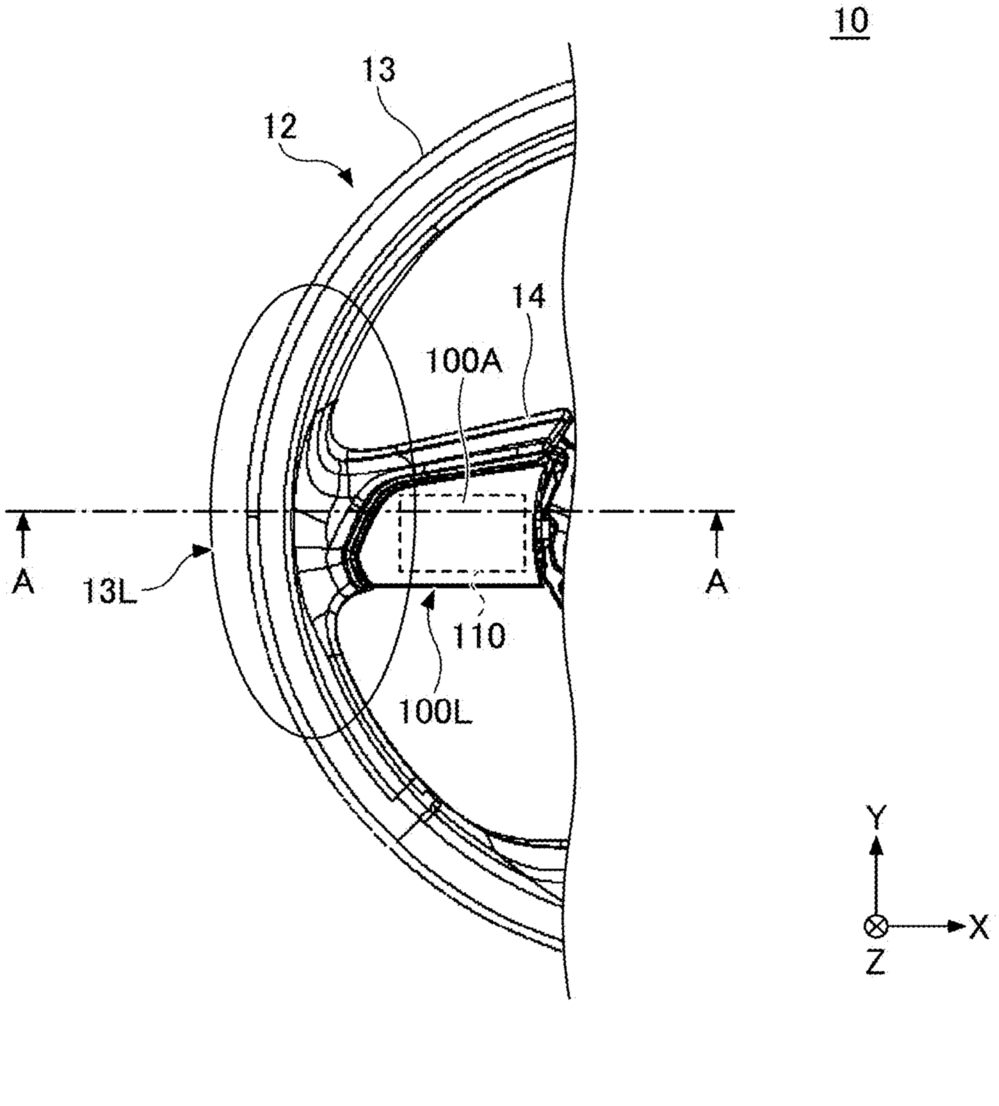
FIG. 1 is a plan view of a steering device according to one embodiment.

FIG. 1 is a plan view of a steering device 10 according to one embodiment.

In description, the following for convenience, an X-axis direction refers to a left-right direction, a Y-axis direction refers to a top-bottom direction, and a Z-axis direction refers to a front-rear direction. The positive direction of the X-axis direction refers to a right direction, the positive direction of the Y-axis direction refers to a top direction, and the positive direction of the Z-axis direction refers to a front direction. They refer to the relative positional relationship in the device, and do not limit the installation direction or operating direction of the device. All devices having the same relative positional relationship in the device, even those having different installation directions or operating directions, are included in the scope of the right of the present invention.

The steering device 10 shown in FIG. 1 is mounted in an interior of a vehicle such as an automobile, and is a device for operating a steering wheel and various types of switches of the vehicle.

As shown in FIG. 1, the steering device 10 includes a steering wheel 12 and two switch units 100 (switch unit 100L, 100R (not shown)).

Figure 2:
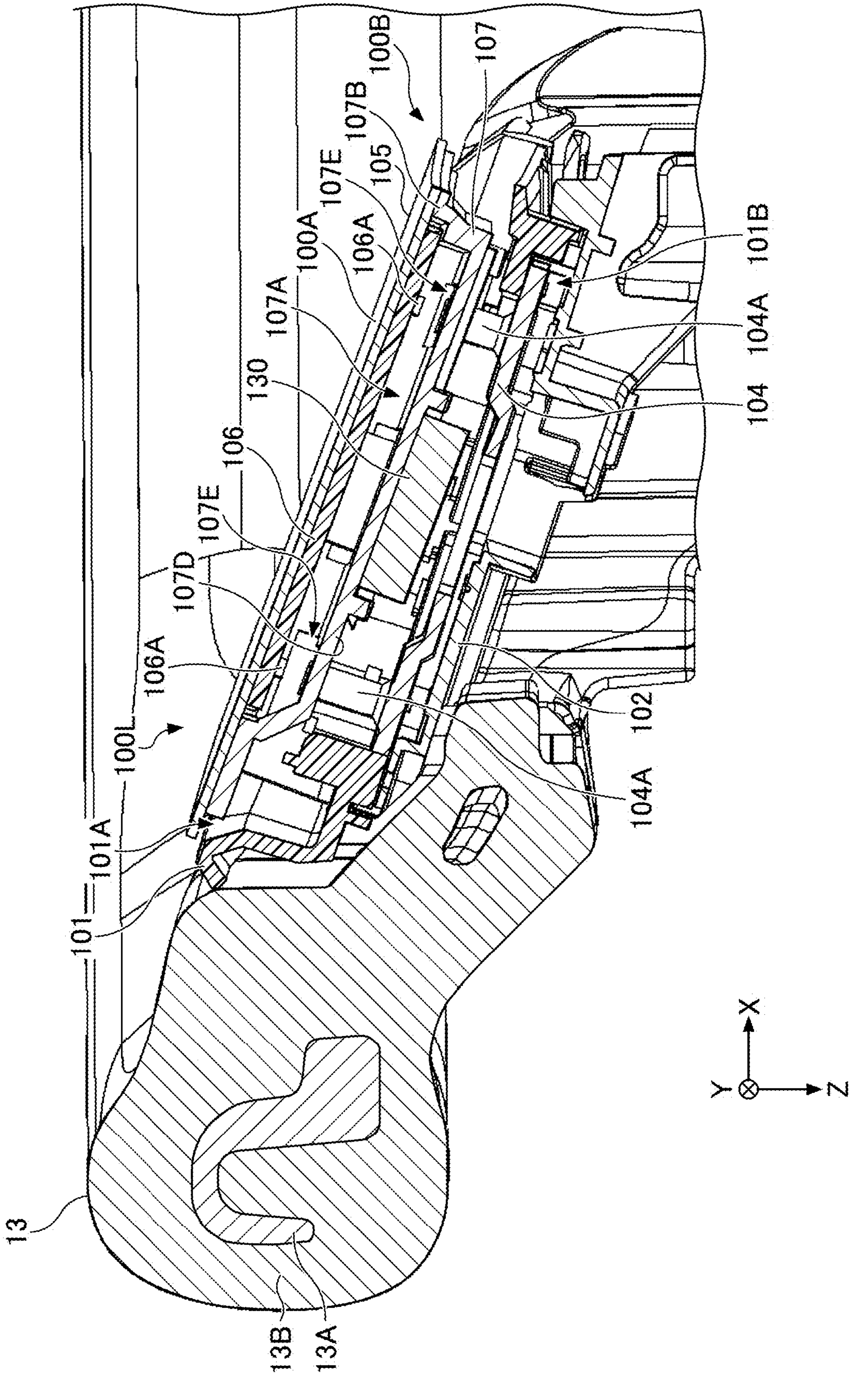
FIG. 2 is an enlarged view illustrating a part of a cross-sectional view taken along the line A-A of the steering device in FIG. 1 according to one embodiment.

The steering wheel 12 includes a rim 13 and a spoke 14. The rim 13 is an annular portion that is gripped with an operator's fingers to steer the vehicle. As shown in FIG. 2, a cross section of the rim 13 includes a metal rim core 13A disposed at a center and a resin (e.g., urethane) covering 13B covering an outer surface of the rim core 13A. A region on the left (X-axis negative direction) of the rim 13 is a grip 13L gripped with the operator's left fingers. A region on the right (X-axis positive direction) of the rim 13 is a grip 13R (not shown) gripped with the operator's right fingers.

The spoke 14 has a spoke core 14A. The spoke core 14A is a metal portion that serves as a base of the spoke 14. The spoke core 14A has a first portion 14A1 (see FIG. 5) extending from the center of the steering wheel 12 in the left-right direction (X-axis direction) and a second portion (not shown) extending from the center of the steering wheel 12 in a downward direction (Y-axis direction). That is, the spoke 14 and the spoke core 14A have a substantially T-shape in plan view from the Z-axis direction.

The first portion 14A1 of the spoke core 14A has an end on the left (X-axis negative direction) connected to the rim core 13A in the region of the grip 13L of the rim 13 (see FIG. 5), and an end on the right (X-axis positive direction) connected to the rim core 13A in the region of the grip 13R of the rim 13 (not shown). The second portion of the spoke core 14A has a bottom (Y-axis negative direction) end connected to the rim core 13A of the rim 13 (not shown). Thus, the spoke core 14A supports the rim 13 from the inside.

Although not shown, the spoke core 14A has a shape in which the center is recessed inwardly (in the Z-axis positive direction), and a through hole provided in the center (on a central axis) is fixed to the steering shaft inserted into the through hole with a nut or the like. Thus, the spoke core 14A rotates together with the steering wheel 12 in accordance with the steering wheel operation, and the steering shaft can be rotated around the central axis.

The spoke core 14A is integrally formed with the rim core 13A of the rim 13 using a metal material. Although not shown, the center of the spoke core 14A is actually covered with a resin cover and a functional component such as a horn.

The switch units 100L and 100R are an example of an "input device" and are installed in the spoke core 14A to perform various switch operations. The switch unit 100L is installed on the left (X-axis negative direction) of the first portion 14A1 of the spoke core 14A. The switch unit 100R is installed on the right (X-axis positive direction) of the first portion 14A1 of the spoke core 14A. The switch units 100L and 100R have a substantially rectangular shape in plan view from the Y-axis negative direction, and surfaces facing the operator (Z-axis negative direction) of the switch units 100L and 100R are surfaces 100A on which various switch operating operations (touch operation and press operation) are performed.

For example, the switch units 100L and 100R can perform an input operation to select an item displayed on the operating surfaces 100A by touching the displayed item with the operator's finger, and a press operation to confirm the selected item by pressing the operating surface 100A with the operator's finger. Although there is a difference between left and right, the basic configuration is the same and the operation and effect are similar, so only the switch unit 100L operated with the left finger will be described below, and the switch unit 100R operated with the right finger will be omitted.

The switch unit 100L is provided close to the grip 13L of the rim 13. The switch unit 100L can detect the input operation and the press operation of the operating surface 100A with the operator's left finger gripping a region of the grip 13L with the touch panel 106 and a distance sensor 106A (see FIG. 2, etc.) provided on a back of the operating surface 100A.

Moreover, when the input operation of the operating surface 100A is performed, the switch unit 100L can vibrate the operating surface 100A by vibrating the vibration generator 130 (see FIG. 2, etc.) provided on the back of the operating surface 100A.

Moreover, when a predetermined condition different from the input operation of the operating surface 100A is satisfied, the switch unit 100L can vibrate the grip 13L of the steering wheel 12 by vibrating the vibration generator 130 provided on the back of the operating surface 100A at a frequency different from the frequency when the input operation of the operating surface 100A is performed.

(Configuration of Switch Unit 100)

Figure 3:
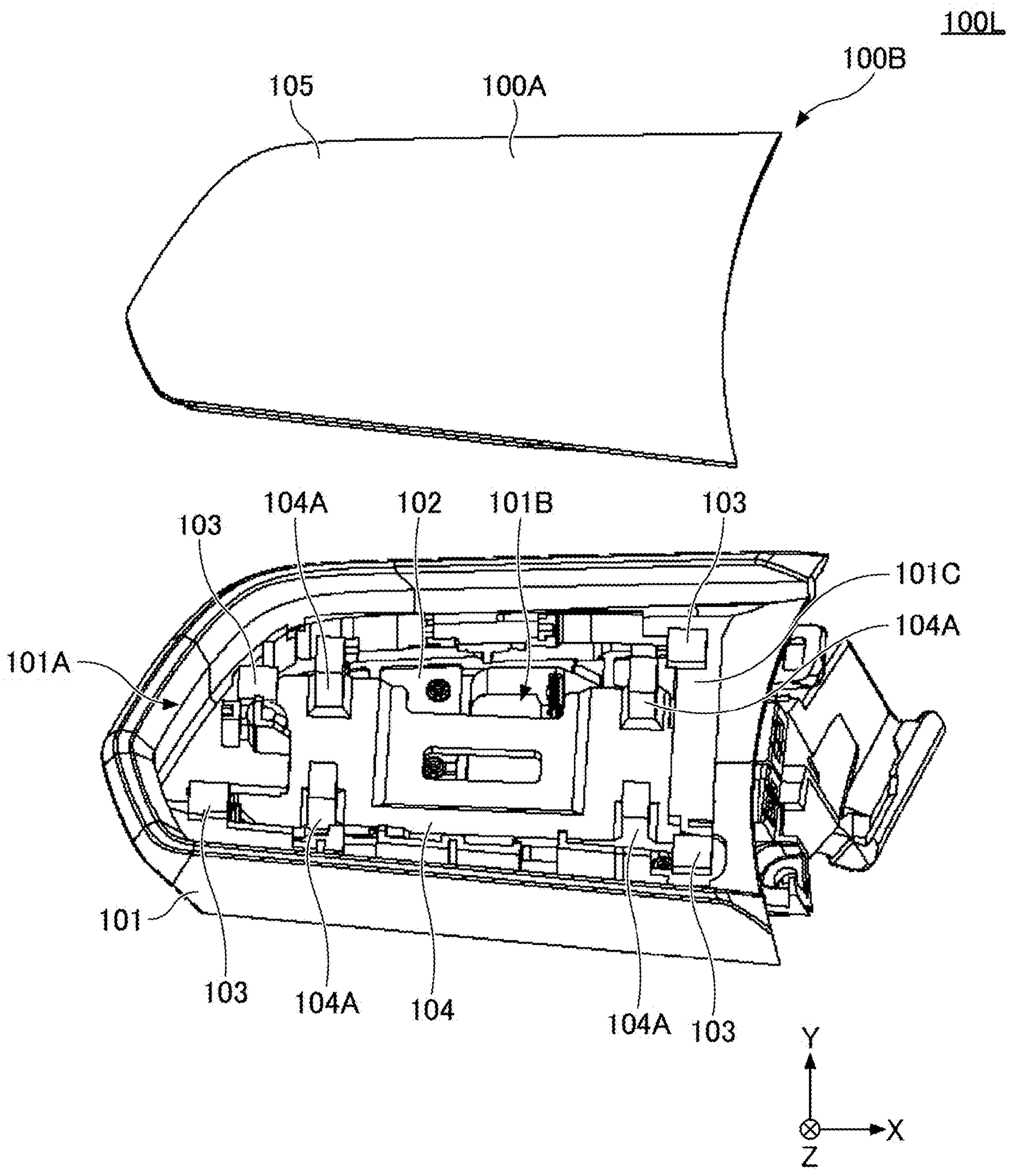
FIG. 3 is an exploded perspective view of a switch unit viewed from a diagonal front according to one embodiment.
Figure 4:
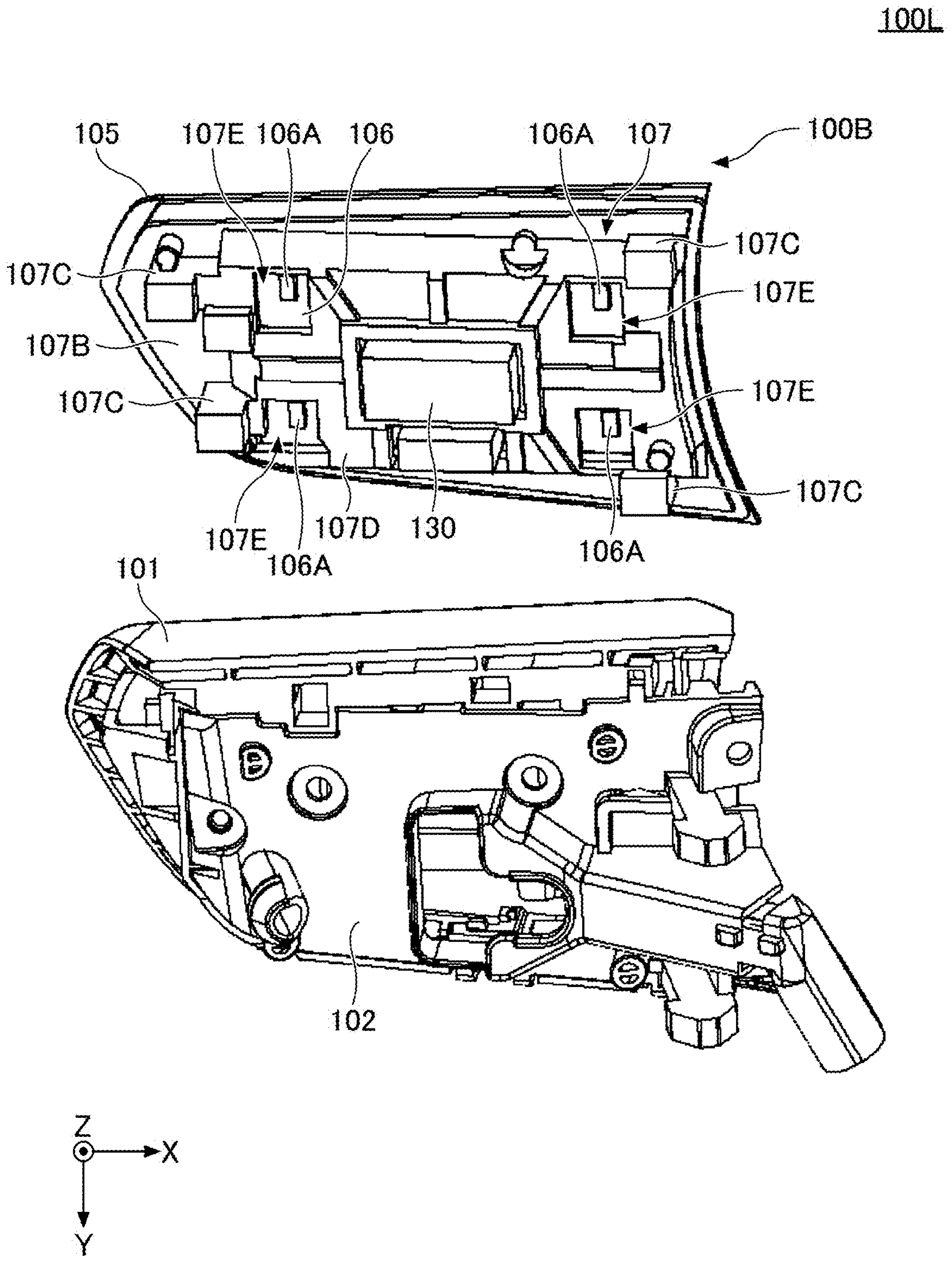
FIG. 4 is an exploded perspective view of the switch unit viewed from a diagonal rear according to one embodiment.

Next, the configuration of the switch unit 100L will be described with reference to FIGS. 2, 3 and 4. FIG. 2 is an enlarged view illustrating a part of a cross-sectional view taken along the line A-A of the steering device 10 in FIG. 1 according to one embodiment. FIG. 3 is an exploded perspective view of the switch unit 100L viewed from a diagonal front according to one embodiment, and a drawing illustrating the touch input part 100B moved forward. FIG. 4 is an exploded perspective view of the switch unit 100L viewed from a diagonal rear according to one embodiment, and a drawing illustrating the switch unit 100L shown in FIG. 3 seen from the diagonal rear.

As shown in FIGS. 2 to 4, the switch unit 100L includes a case 101, a cover 102, four vibration transmission members 103, a base member 104, a touch input part 100B, and a vibration generator 130.

The case 101 is a resin container-like member which is thin in a front-rear direction (Z-axis direction). The case 101 includes the touch input part 100B, the four vibration transmission members 103, the vibration generator 130, and the like. The case 101 has a generally pentagonal operator-side opening 101A facing the operator (Z-axis negative direction) in plan view from the Z-axis direction. In the same plan view, a generally rectangular bottom opening 101B is formed at a center of a bottom (Z-axis positive direction), that is, at a center of an inner bottom surface 101C.

The cover 102 is a resin and cover-like member attached to the bottom of the case 101 from the front (Z-axis positive direction) of the case 101 so as to cover the bottom opening 101B of the case 101.

The four vibration transmission members 103 are provided at four corners of the inner bottom surface 101C of the case 101. That is, the four vibration transmission members 103 are provided under four legs 107C of a support member 107 of the touch input part 100B. The four vibration transmission members 103 are interposed between the inner bottom surface 101C of the case 101 and the four legs 107C of the support member 107. Each of the four vibration transmission members 103 is a sheet-like member having elasticity and has a rectangular shape in plan view.

The four vibration transmission members 103 are provided to transmit the vibration of the touch input part 100B generated by the vibration generator 130 to the case 101 and to adjust the resonance characteristics (see FIG. 7) of the vibration system (see FIG. 5) provided in the steering device 10. Therefore, the four vibration transmission members 103 may be made of any material, such as metal, resin, or elastic material, as long as it is possible to transmit at least the vibration of the touch input part 100B to the case 101 and to adjust the resonance characteristics of the vibration system provided in the steering device 10. For example, in the present embodiment, silicon rubber, which is an example of an elastic material, is used for each of the four vibration transmission members 103.

In the present embodiment, although the vibration transmission member 103 is provided between the leg 107C of the support member 107 and the inner bottom surface 101C of the case 101, the vibration transmission member 103 may be provided at any location at least on the vibration transmission path of the vibration system (see FIG. 5) provided in the steering device 10.

The base member 104 is a resin-made, flat-plate member disposed in the bottom opening 101B of the case 101 and fixed to the case 101. The base member 104 has four prismatic protrusions 104A which are vertically disposed upward from four corners of the upper surface of the base member 104. Each of the four protrusions 104A is disposed through each of the four openings 107E formed in the bottom surface 107D of the support member 107. The upper end surfaces of each of the four protrusions 104A are disposed opposite to each of the four distance sensors 106A provided on the back surface of the touch panel 106 in a recess 107A of the support member 107 with a predetermined distance.

The touch input part 100B includes a cover glass 105, the touch panel 106, and the support member 107 provided integrally.

The cover glass 105 is a flat plate member provided in the innermost rear part of the case 101 (inside the operator-side opening 101A). The cover glass 105 is formed of a hard material (e.g., glass, resin). A surface of the cover glass 105 facing the operator is an operating surface 100A on which an input operation is performed. On the operating surface 100A, symbols or the like indicating operation contents are provided at each of a plurality of operation positions by printing or the like. The cover glass 105 has substantially the same shape (i.e., generally pentagonal) as the operator-side opening 101A of the case 101 in plan view, and is provided in the operator-side opening 101A so as to close the operator-side opening 101A of the case 101.

The touch panel 106 is an example of a "detection part for detecting an input operation to a touch input part". The touch panel 106 is a panel-like member provided in the case 101 (inside the operator-side opening 101A) and superposed on the back surface of the cover glass 105. The touch panel 106 has a plurality of detection electrodes (not shown) for detecting electrostatic capacitance of the operator's finger. The touch panel 106 detects the input operation to the operating surface 100A with the operator's finger with the plurality of detection electrodes with an electrostatic method. The touch panel 106 is integrated as a single body with the cover glass 105 by being adhered to the back surface of the cover glass 105 with a double-sided tape or the like.

Four distance sensors 106A are provided at four corners of the back surface of the touch panel 106. Each of the four distance sensors 106A is disposed opposite to each of the upper end surfaces of the four protrusions 104A of the base member 104 at a predetermined distance. When the touch panel 106 is pressed, each of the four distance sensors 106A detects the distance variation from the base member 104 in order to determine the pressed place and the pressed amount.

The support member 107 is provided inside the case 101 (inside the operator-side opening 101A) on the back of the cover glass 105 and the touch panel 106, and is a resin member for holding the cover glass 105 and the touch panel 106. The support member 107 has a recess 107A having a recessed shape from the upper part downward and a peripheral part 107B having a horizontal flat plate shape surrounding the recess 107A. The recess 107A has a rectangular shape slightly larger than the touch panel 106 in plan view. A touch panel 106 integrated with the cover glass 105 is arranged in the upper opening of the recess 107A. The peripheral part 107B supports the cover glass 105 and the touch panel 106 by bonding the back surface of the cover glass 105 (the peripheral part of the touch panel 106) to the front surface of the peripheral part 107B.

The support member 107 has four legs 107C. The four legs 107C have a prismatic shape extending in the top-bottom direction (Z-axis direction) and are provided so as to hang downward from the back surface of the peripheral part 107B. The support member 107 is supported by the case 101 so as to be capable of vibrating by supporting the bottom end surfaces of the four legs 107C by the inner bottom surface 101C of the case 101 via the vibration transmission member 103.

The support member 107 has four rectangular openings 107E at four corners of the bottom surface 107D. Four protrusions 104A of the base member 104 are inserted into each of the four openings 107E.

The vibration generator 130 is an example of a vibration output part that vibrates the touch input part. The vibration generator 130 is fixed to the bottom surface 107D (i.e., the back surface of the touch input part 100B) of the support member 107 inside the case 101. For example, the vibration generator 130 is bonded to the back surface of the bottom surface 107D of the support member 107 with a double-sided tape. The vibration generator 130 has a substantially rectangular parallelepiped shape.

In the present embodiment, the vibration generator 130 is an LRA (Linear Resonant Actuator) provided with a magnet and a coil, in which the vibrating mass is capable of resonant vibration only in one direction (this is a general internal structure and is not shown). The vibration generator 130 is configured to generate vibration controlled by a control device 110 (see FIG. 6). The vibration generator 130 is adhered to the support member 107 in a state in which the direction in which resonant vibration can occur in a plane view parallel to the operating surface 100A of the touch input part 100B and from the Z-axis direction is aligned with the left-right direction (X-axis direction), and the touch input part 100B can vibrate in a left-right direction parallel to the operating surface 100A via the support member 107. It is preferable that the vibration generator 130 outputs vibration in a direction parallel to the operating surface 100A of the touch input part 100B during touch operation, and the parallel vibration facilitates the operator's finger to feel the vibration compared to vertical vibration.

In one embodiment, the support member 107 is vibrated in the left-right direction parallel to the operating surface 100A by the vibration generator 130, but it is not limited to this, and can be vibrated in any direction parallel to the operating surface 100A of the touch input part 100B.

Further, although details will be described later, specifications of the vibration generator 130 used in a second embodiment are different from the above. Specifically, the vibration generator 130 of the second embodiment is configured to be driven at driving frequencies A and B different from each other so as to generate vibration in two directions (the first short direction (A1 and A2 direction) and the second short direction (B1 and B2 direction)) of the external shape of the vibration generator 130 orthogonal to each other (see FIGS. 8 to 10B). As an example, the vibration generator 130 is disposed on the bottom surface 107D of the support member 107 so that the first short direction (A1 and A2 direction) of the external shape of the vibration generator 130 coincides with the left-right direction (X-axis direction) in plan view from the Z-axis direction. Thus, by driving the vibration generator 130 at the driving frequency A resonantly vibrating in the first short direction (A1 and A2 direction), the touch input part 100B can vibrate in the left-right direction (X-axis direction) parallel to the operating surface 100A as in the above-described embodiment.

Furthermore, in the second embodiment, the vibration generator 130 is disposed on the bottom surface 107D of the support member 107 so that the second short direction (B-axis direction) of the external shape coincides with the direction perpendicular to the operating surface 100A. By driving the vibration generator 130 at a frequency B resonantly vibrating in the second short direction (B-axis direction), the touch input part 100B can vibrate in a direction perpendicular to the operating surface 100A. In the second embodiment, the vibration in a direction different from the vibration in a direction parallel to the operating surface 100A of the touch input part 100B (a direction perpendicular to the operating surface 100A) can be fed back to the operator via the steering wheel 12.

In the switch unit 100L configured as described above, when an input operation to the operating surface 100A of the cover glass 105 is performed with the operator's finger, capacitance of the touch panel 106 changes. Therefore, the switch unit 100L can detect the input operation based on the detected value of the capacitance output from the touch panel 106.

When the operating surface 100A of the cover glass 105 of the switch unit 100L is pressed with the operator's finger, the touch input part 100B moves downward while pressing and contracting at least one of the vibration transmission members 103, whereby the distance of each of the four distance sensors 106A provided on the back surface of the touch panel 106 to the upper end surface of the protrusion 104A of the base member 104 changes. Therefore, the switch unit 100L can detect the pressing operation based on the detected value of the distance output from each of the four distance sensors 106A.

Thus, the configuration of the switch unit 100L has been described. The configuration of the switch unit 100R is substantially symmetrical to that of the switch unit 100L, and is basically the same as that of the switch unit 100L.

(Configuration of Vibration System and Vibration Transmission Path of Steering Device 10)

Figure 5:
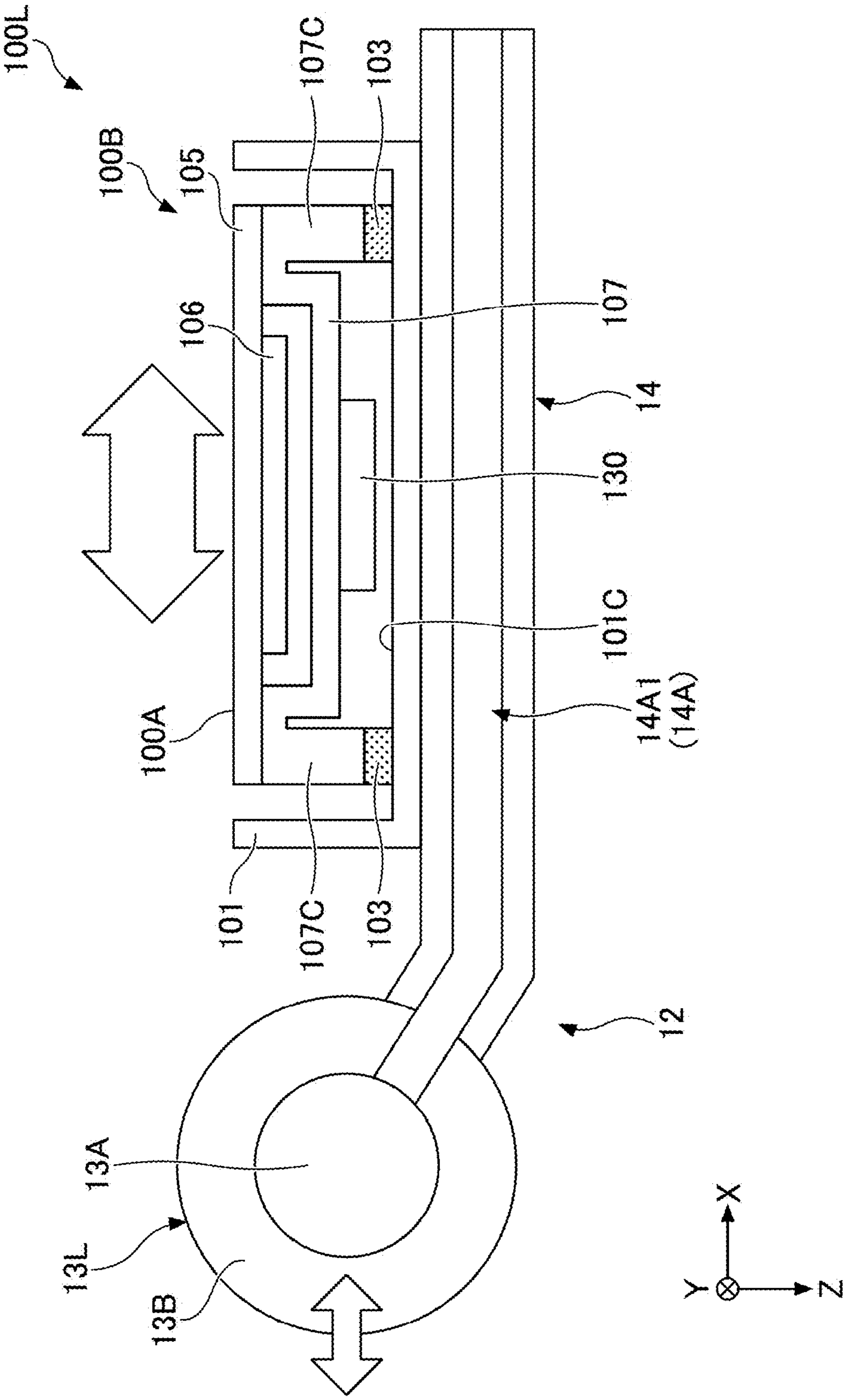
FIG. 5 is a drawing schematically illustrating a configuration of a vibration system included in the switch unit according to one embodiment.

FIG. 5 is a drawing schematically illustrating a configuration of a vibration system included in the steering device 10 according to one embodiment. For the sake of simplicity, an example of vibration in the X-axis direction of a model in which the left-right direction and the X-axis direction coincide will be described.

As shown in FIG. 5, in the switch unit 100L, each of the bottom end surfaces of the plurality of corresponding legs 107C of the support member 107 is fixed to the inner bottom surface 101C of the case 101 via the respective vibration transmission members 103. The case 101 is fixed to the spoke 14 of the steering wheel 12.

Thus, the switch unit 100L has a "vibration transmission path" from the vibration generator 130 to the grip 13L of the steering wheel 12 via the touch input part 100B, the plurality of vibration transmission members 103, the case 101, and the spoke 14 (core and urethane).

The configuration of the "vibration system" provided in the steering device 10 according to one embodiment includes a plurality of members which exist and vibrate integrally while the vibration generated in the vibration generator 130 is transmitted to the vibration transmission member 103.

Specifically, in the configuration of the vibration system provided in the steering device 10, as shown in FIG. 5, the touch input part 100B provided with the cover glass 105, the touch panel 106, and the support member 107, the vibration generator 130, and the vibration transmission member 103 are integrally provided on the vibration transmission path in a state in which they can vibrate.

Therefore, the switch unit 100L can cause the support member 107, the touch panel 106, and the cover glass 105 to vibrate integrally in the left-right direction (X-axis direction), for example, as the vibration generator 130 vibrates in the left-right direction (X-axis direction), and the vibration in the left-right direction (X-axis direction) is transmitted to the operator's finger in contact with the operating surface 100A of the cover glass 105.

Therefore, when a predetermined condition other than the input operation on the operating surface 100A is satisfied (e.g., when a signal is of such a input indicating activation as predetermined driving assistance function and a lane departure warning), the switch unit 100L vibrates the vibration generator 130 in the left-right direction (X-axis direction). The vibration in the left-right direction (X-axis direction) is transmitted to the grip 13L of the steering wheel 12 through the touch input part 100B, the plurality of vibration transmission members 103, the case 101, and the spoke 14 along the vibration transmission path. Thus, the operator's palm gripping the grip 13L can feel the transmitted vibration in the left-right direction (X-axis direction).

The configuration of the vibration system including the switch unit 100L has been described above. The configuration of the vibration system including the switch unit 100R is substantially symmetrical to the configuration of the vibration system including the switch unit 100L, and the configuration is basically the same the as configuration of the vibration system including the switch unit 100L. Therefore, a description of the configuration of the vibration system including the switch unit 100R is omitted.

(Configuration of Control System of Switch Unit 100)

Figure 6:
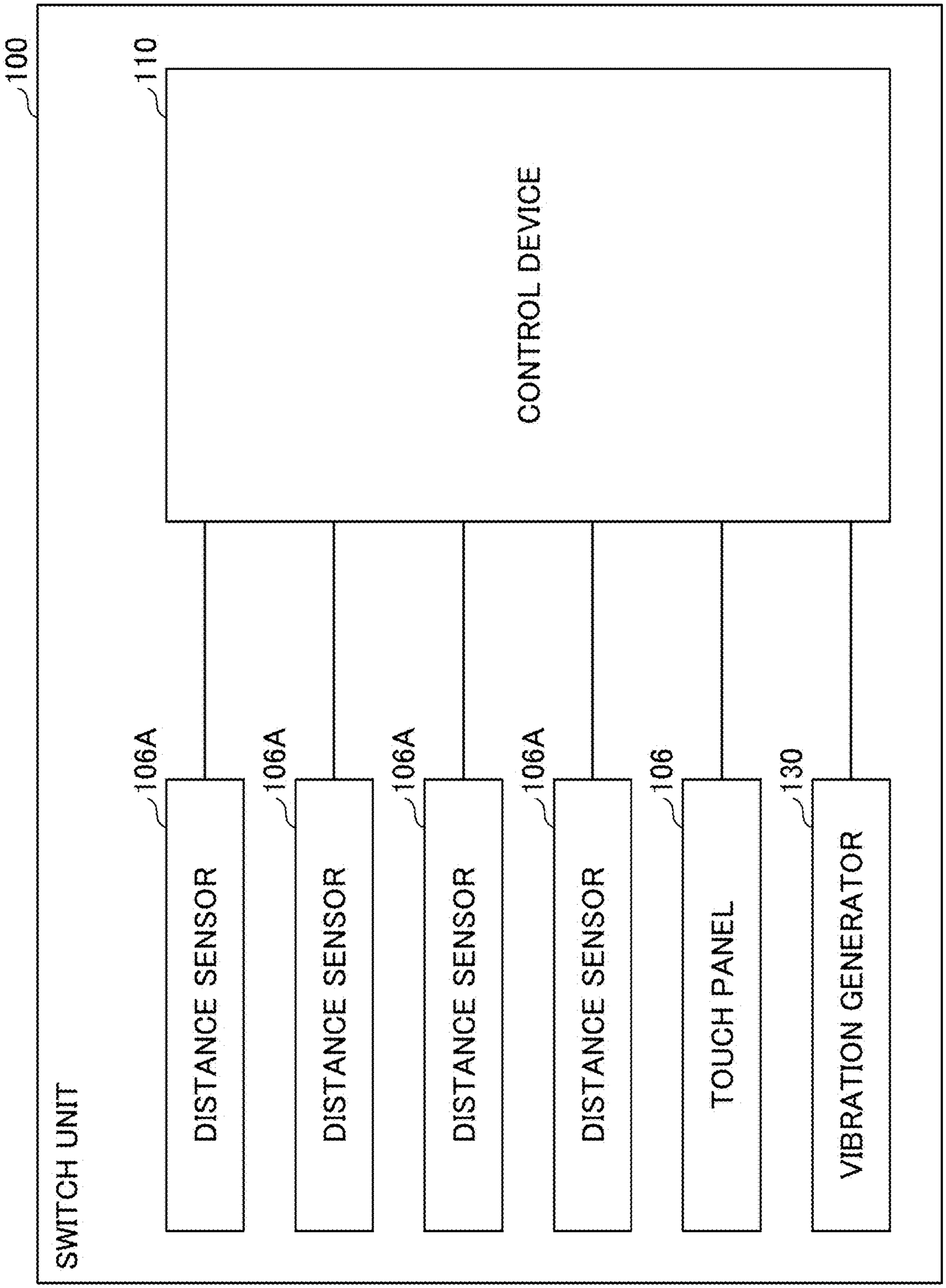
FIG. 6 is a drawing illustrating a configuration of a control system provided in the switch unit according to one embodiment.

FIG. 6 is a drawing illustrating a configuration of a control system provided in the switch unit 100 according to one embodiment. As shown in FIG. 6, the switch unit 100 according to one embodiment includes, as a control system, the touch panel 106, the vibration generator 130, and the four distance sensors 106A, and the control device 110. The configuration of the control system of the switch unit 100 shown in FIG. 6 is the configuration common to the switch units 100L and 100R.

The control device 110 is an example of a "controller that drives the vibration output part". The control device 110 is electrically connected to each of the touch panel 106, the vibration generator 130, and the four distance sensors 106A.

For example, the control device 110 can detect an input operation based on a detected value of capacitance output from the touch panel 106 when the operator touches the operating surface 100A with a finger and when the capacitance variation exceeds a predetermined threshold.

Further, for example, the control device 110 can detect a pressing operation based on detected values of distances output from each of the four distance sensors 106A when the operator presses the operating surface 100A with a finger and when the distance variation exceeds a predetermined threshold.

Further, when the control device 110 detects an input operation (touch operation or press operation) to the operating surface 100A with the operator's finger, the control device 110 can drive the vibration generator 130 to cause the vibration generator 130 to vibrate in the left-right direction (X-axis direction), for example, to cause the touch input part 100B to vibrate in the left-right direction (X-axis direction), so that the operator's finger in contact with the operating surface 100A of the cover glass 105 feels the vibration in the left-right direction (X-axis direction), and the operator can confirm completion of the input operation.

In this case, the control device 110 drives the vibration generator 130 at the driving frequency F1 (higher than the resonance frequency F of the vibration system) of the vibration damping region of the vibration system (see FIG. 5) provided in the steering device 10 with the first signal. Further details are described later referring to FIG. 7.

As a result, the switch unit 100 according to one embodiment can damp the vibration generated by the vibration generator 130 in the vibration transmission path of the vibration system so that the vibration is not readily transmitted to the grips 13L and 13R of the steering wheel 12. Therefore, even when the operator operates the operating surface 100A while gripping the grips 13L and 13R, the vibration of the grips 13L and 13R is small and the vibration of the operating surface 100A is large, and the vibration is applied to the fingertip without the palm moving, so that the operator's fingers can easily feel the vibration of the operating surface 100A.

In addition, when a predetermined condition different from the input operation to the operating surface 100A is satisfied (e.g., when a signal is input indicating activation of a predetermined driving assistance function (e.g., lane departure warning, etc.)), the control device 110 can drive the vibration generator 130 to cause the vibration generator 130 to vibrate in the left-right direction (X-axis direction) so that the vibration in the left-right direction (X-axis direction) is transmitted to the grips 13L and 13R of the steering wheel 12 via the support member 107, the four vibration transmission members 103, the case 101, and the spoke 14 of the steering wheel 12, so that the operator's palm gripping the grips 13L and 13R can feel the vibration in the left-right direction (X-axis direction).

In this case, the control device 110 drives the vibration generator 130 at the driving frequency F2 (lower than the t resonance frequency F of the vibration system) of the vibration amplification region of the vibration system (see FIG. 5) provided in the steering device 10 with the second signal. Further details are described later referring to FIG. 7.

Thus, the switch unit 100 according to one embodiment can facilitate the transmission of the vibration to the grips 13L and 13R of the steering wheel 12 by amplifying the vibration generated by the vibration generator 130 on the vibration transmission path of the vibration system. Therefore, the vibration of the grips 13L and 13R can be perceived more easily with the operator's palm.

The control device 110 is achieved by using a computer (e.g., IC (Integrated Circuit)) including such as a processor (e.g., CPU), a storage medium (e.g., ROM (Read Only Memory), RAM (Random Access Memory), SSD (Solid State Drive), etc.), and an external interface. Moreover, the control processing in the control device 110 is achieved by, for example, using the processor executing a program stored in the storage medium in the control device 110.

(Example of Resonance Frequency of Vibration System of Steering Device 10)

Figure 7:
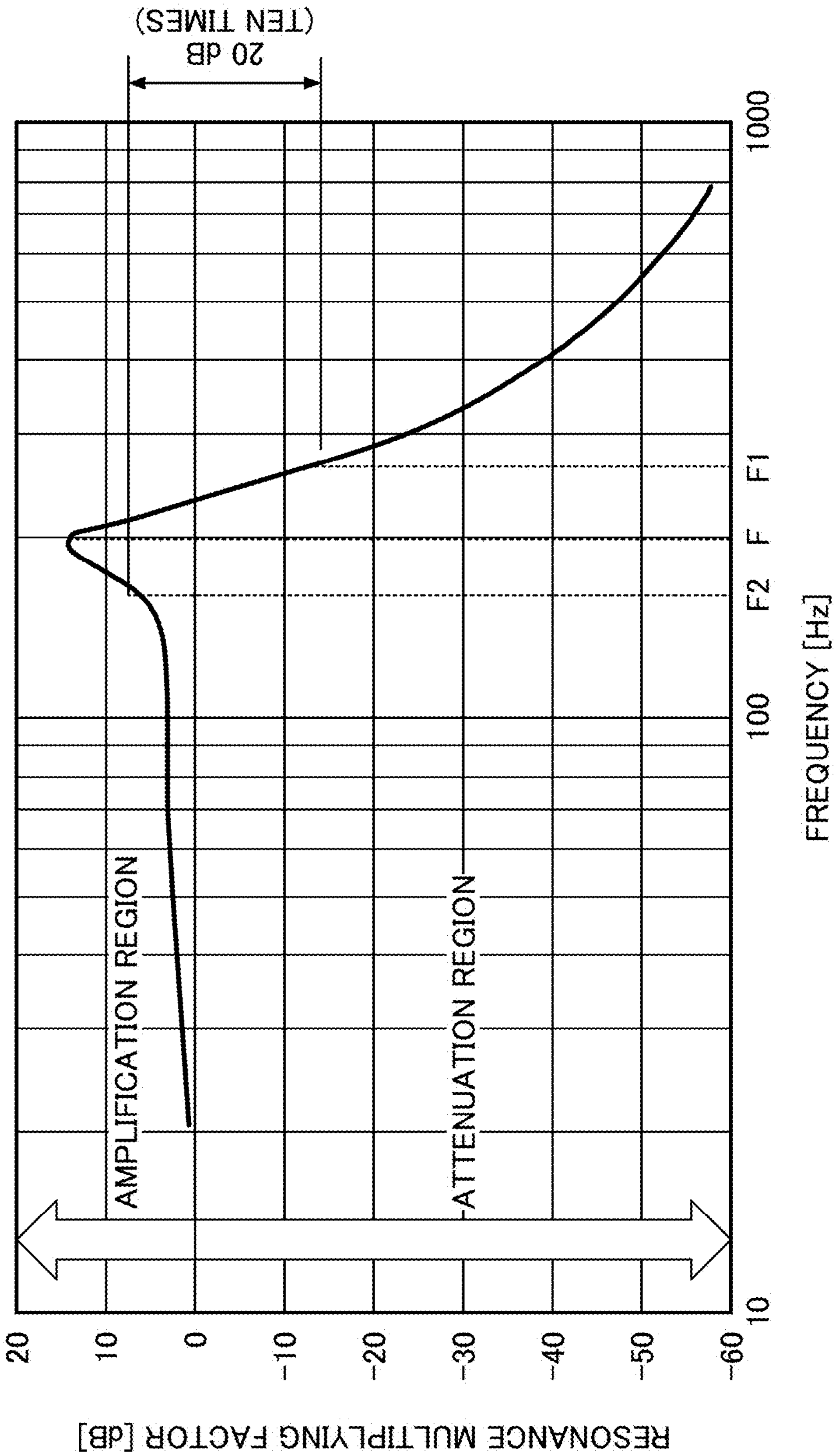
FIG. 7 is a drawing illustrating an example of resonance characteristics of the vibration system provided in the switch unit according to one embodiment.

FIG. 7 is a drawing illustrating an example of resonance characteristics of the vibration system including the vibration transmission member 103 provided in the steering device 10 according to one embodiment. A graph shown in FIG. 7: shows the relationship between frequency [Hz] (horizontal axis) and resonance multiplying factor [dB] (vertical axis) of the vibration system provided in the steering device 10 (see FIG. 5).

In the example shown in FIG. 7, the vibration system provided in the steering device 10 has a resonance frequency F (e.g., 200 Hz). Further, the vibration system included in the steering device 10 has a vibration amplification region in which the resonance multiplying factor [dB] is greater than zero and increases with the frequency [Hz], within a frequency range lower than the resonance frequency F (including frequencies close to the resonance frequency F). Further, the vibration system included in the steering device 10 has a vibration damping region in which the resonance multiplying factor [dB] is less than zero and decreases with the frequency [Hz], within a frequency range higher than the resonance frequency F (including frequencies close to the resonance frequency F).

Further, when the control device 110 detects an input operation to the operating surface 100A with the operator's finger, the control device 110 can drive the vibration generator 130 to cause the vibration generator 130 to vibrate in the left-right direction (X-axis direction) parallel to the operating surface 100A, thereby causing the touch input part 100B to vibrate in the left-right direction (X-axis direction) parallel to the operating surface 100A, so that the operator's finger in contact with the operating surface 100A of the cover glass 105 can feel the vibration in the left-right direction (X-axis direction) parallel to the operating surface 100A.

For example, when the control device 110 detects an input operation to the operating surface 100A with the operator's finger, the control device 110 drives the vibration generator 130 with the first signal at a predetermined driving frequency F1 (e.g., 250 Hz) in the vibration damping region of the vibration system provided in the steering device 10 to vibrate the touch input part 100B. As a result, the control device 110 can damp the vibration generated by the vibration generator 130 in the vibration transmission path of the vibration system to hinder the vibration from being transmitted to the grips 13L and 13R of the steering wheel 12.

For example, when a predetermined condition different from the input operation to the operating surface 100A is satisfied (e.g., when a signal indicating that the vehicle has departed from the lane is input), the control device 110 vibrates the touch input part 100B by driving the vibration generator 130 with a second signal at a predetermined driving frequency F2 (e.g., 150 Hz) in the vibration amplification region of the vibration system provided in the steering device 10. As a result, the control device 110 can amplify the vibration generated by the vibration generator 130 in the vibration transmission path of the vibration system to facilitate the vibration to be transmitted to the grips 13L and 13R of the steering wheel 12.

For example, in the example shown in FIG. 7, when a predetermined condition different from the input operation to the operating surface 100A is satisfied, the grips 13L and 13R of the steering wheel 12 can be vibrated with a strength approximately ten times greater (by approximately 20 dB) than when the input operation to the operating surface 100A is performed.

As described above, the control device 110 can change the strength of the vibration transmitted to the grips 13L and 13R of the steering wheel 12 by changing the driving frequency F1 of the first signal and the driving frequency F2 of the second signal.

As a result, since the switch unit 100 according to one embodiment can change the ease with which vibration is transmitted to the grips 13L and 13R of the steering wheel 12 by changing the driving frequency F1 of the first signal and the driving frequency F2 of the second signal, strength of the vibration transmitted to the operator's palm can be changed more easily.

In particular, the control device 110 drives the vibration generator 130 at the resonance frequency F (in the present embodiment, 200 Hz) of the vibration system or at a driving frequency F2 (in the present embodiment, 150 Hz) close to the resonance frequency with the second signal, and drives the vibration generator 130 at a driving frequency F1 (in the present embodiment, 250 Hz) higher than when the second signal is used, with the first signal.

Thus, the switch unit 100 according to one embodiment can cause the grips 13L and 13R of the steering wheel 12 to vibrate more strongly by driving the vibration generator 130 with the second signal, and can reliably transmit the vibration to the operator via the grips 13L and 13R. Moreover, the switch unit 100 according to one embodiment can hinder the vibration from being transmitted to the grips 13L and 13R of the steering wheel 12 by driving the vibration generator 130 with the first signal, and can reliably transmit the vibration to the operator operating the operating surface 100A with the finger with gripping the grips 13L and 13R via the operating surface 100A.

An example having a resonance frequency F of 200 Hz is shown above. However, the frequency can be adjusted by appropriately changing the mass, material, or other properties of the components forming the vibration system. For example, the resonance characteristics of the vibration system of the steering device 10 illustrated in FIG. 7 can be obtained by simulation according to the configuration of the steering device 10 using the mass of the touch input part 100B and the elastic modulus of the vibration transmission member 103 as parameters. Therefore, for example, the predetermined frequencies F1 and F2 can be determined from the resonance characteristics obtained by simulation after the configuration of the steering device 10 is determined.

(Example of Configuration of Vibration Generator 130)

Figure 8:
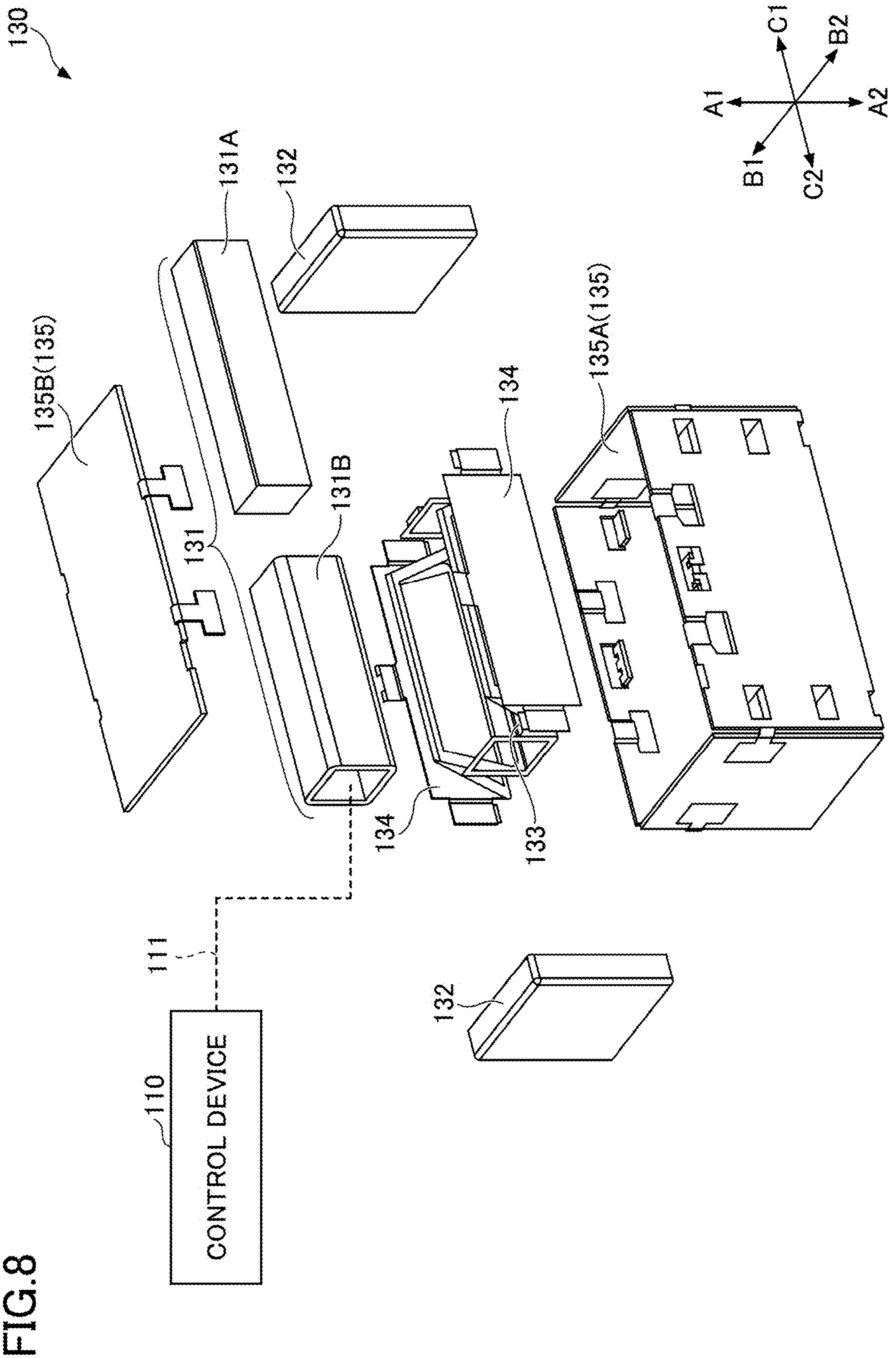
FIG. 8 is an exploded perspective view illustrating an example of the configuration of a vibration generator according to a second embodiment.

FIG. 8 is an exploded perspective view illustrating an example of the configuration of a vibration generator 130 according to the second embodiment. As shown in FIG. 8, the vibration generator 130 includes a housing 135, a vibrating mass 131, a pair of magnets 132, a holding part 133, and a pair of elastic supports 134.

In FIG. 8, a longitudinal direction of the outer shape of the vibration generator 130 is referred to as a C1 and C2 direction. In FIG. 8, the first short direction (direction orthogonal to the longitudinal direction) of the outer shape of the vibration generator 130 is referred to as an A1 and A2 direction. In FIG. 8, the second short direction (direction orthogonal to the longitudinal direction and the first short direction) of the outer shape of the vibration generator 130 is referred to as a B1 and B2 direction.

The housing 135 is a metal box-shaped (approximately rectangular parallelepiped shape) member. The housing 135 houses each component (the vibrating mass 131, the pair of magnets 132, the holding part 133, and the pair of elastic supports 134) inside. In the example shown in FIG. 8, the housing 135 has a box-shaped (approximately rectangular parallelepiped shape) body part 135A having an upper opening and a flat-plate lid 135B closing the upper opening of the body part 135A.

The vibrating mass 131 has a magnetic core 131A and a coil 131B. The magnetic core 131A is formed by using a ferromagnetic material. The magnetic core 131A is a prismatic member extending in a direction parallel to the longitudinal direction of the vibration generator 130 (i.e., C1 and C2 direction). The coil 131B is a square cylindrical member formed by winding a conductor around the outer peripheral surface of the magnetic core 131A. The vibrating mass 131 functions as an electromagnet that generates a magnetic field when a current flows through the coil 131B.

As shown in FIG. 8, the coil 131B is connected to the control device 110 provided in the switch unit 100 with any interconnecting member 111 (e.g., Flexible Printed Circuit (FPC), etc.). Thus, the coil 131B can control the current flowing through the coil 131B controlled by the control device 110.

The pair of magnets 132 are disposed on opposite sides of the vibrating mass 131 in the longitudinal direction (C1 and C2 direction) of the vibration generator 130, with the vibrating mass 131 interposed between the pair of magnets 132. That is, each of the pair of magnets 132 is provided to face the corresponding end of the vibrating mass 131 in the longitudinal direction (C1 and C2 direction).

The holding part 133 is a metal member for holding the vibrating mass 131. In the example shown in FIG. 8, the holding part 133 has a horizontal planar part, and the bottom surface of the vibrating mass 131 is supported by the planar part.

The pair of elastic supports 134 are disposed on opposite sides of the vibrating mass 131 in the second short direction (B1 and B2 direction) of the vibration generator 130, with the vibrating mass 131 interposed between the pair of elastic supports 134. Each of the pair of elastic supports 134 has a shape in which a plurality of metal plates are folded multiple times in the second short direction (B1 and B2 direction) of the outer shape of the vibration generator 130. Thus, each of the pair of elastic supports 134 is elastically deformable so as to flex in the first short direction (A1 and A2 direction) of the outer shape of the vibration generator 130, and elastically deformable so as to expand and contract in the second short direction (B1 and B2 direction) of the outer shape of the vibration generator 130.

Each of the pair of elastic supports 134 has a folded structure described above, providing a first elastic coefficient for deformation in the first short direction (A1 and A2 direction) of the outer shape of the vibration generator 130 and a second elastic coefficient for deformation in the second short direction (B1 and B2 direction) of the outer shape of the vibration generator 130. Note that, the first elastic coefficient and the second elastic coefficient are different from each other. Thus, the vibration generator 130 has resonance frequencies A and B different from each other in directions different from each other.

Each of the pair of elastic supports 134 has an outer end of the vibration generator 130 in the second short direction (B1 and B2 direction) of the outer shape fixed to the housing 135, and an inner end of the vibration generator 130 in the second short direction (B1 and B2 direction) of the outer shape fixed to the holding part 133. Particularly, in the second embodiment, each of the pair of elastic supports 134 is formed integrally with the holding part 133 provided between the pair of elastic supports 134 by processing a single metal plate.

As a result, the vibration generator 130 can vibrate the vibrating mass 131 held by the holding part 133, along the first short direction (A1 and A2 direction) of the outer shape of the vibration generator 130 and the second short direction (B1 and B2 direction) of the outer shape of the vibration generator 130 by driving the vibrating mass 131 at mutually different frequencies, by elastic deformation of the pair of elastic supports 134 inside the housing 135.

(Example of Operation of Vibration Generator 130)

Figure 9A:
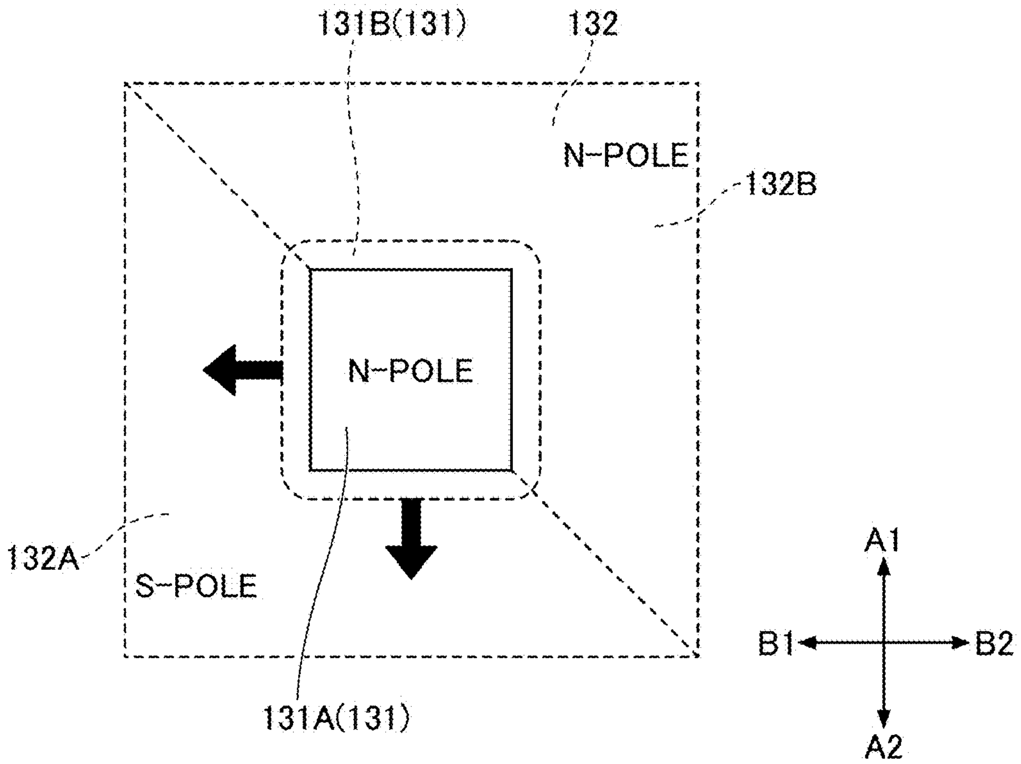
FIG. 9A is a drawing illustrating a driving direction of a magnetic drive part provided in the vibration generator according to the second embodiment.
Figure 9B:
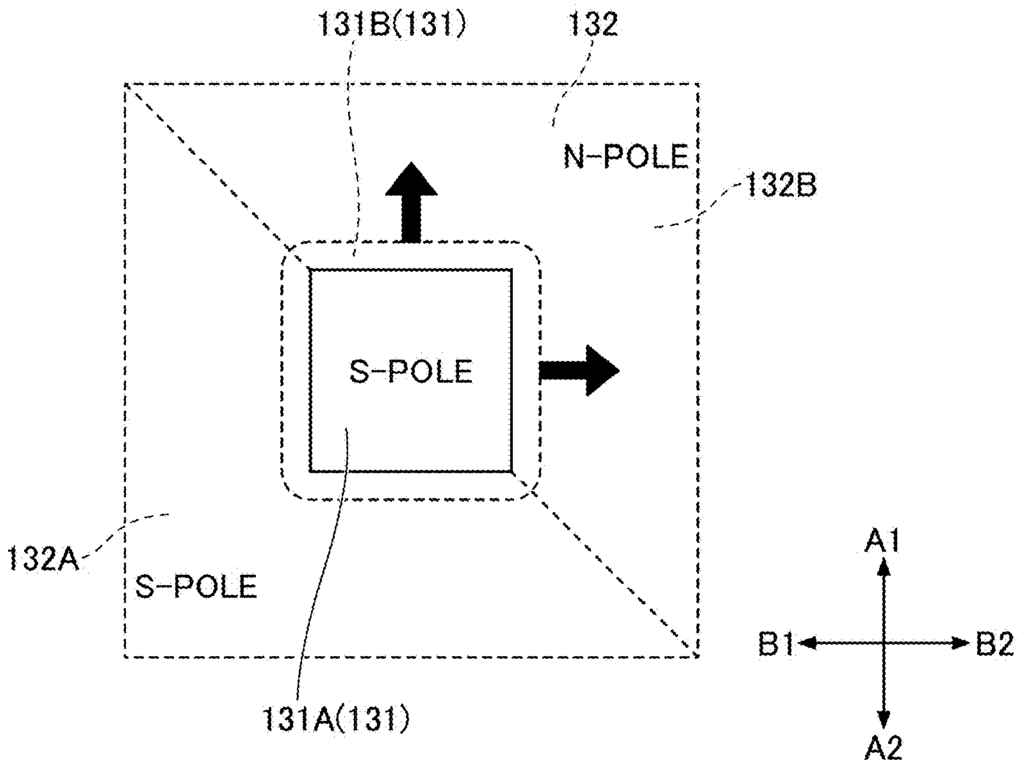
FIG. 9B is a drawing illustrating the driving direction of the magnetic drive part provided in the vibration generator according to the second embodiment.
Figure 10A:
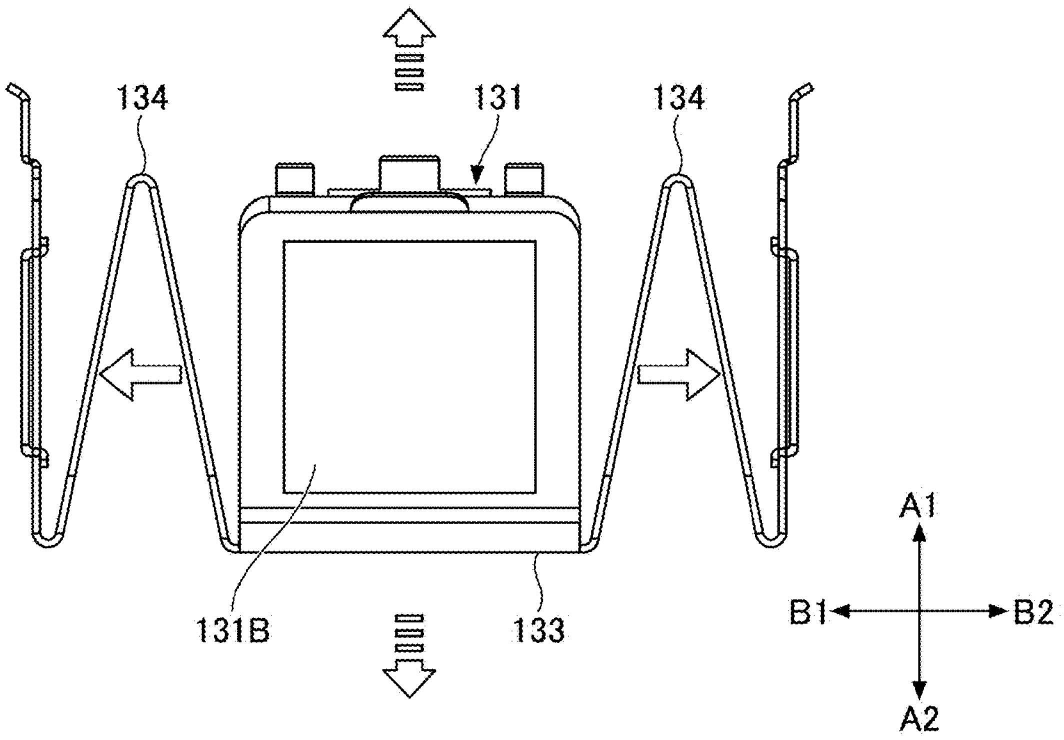
FIG. 10A is a drawing illustrating a vibration direction of a vibrating mass provided in the vibration generator according to the second embodiment.
Figure 10B:
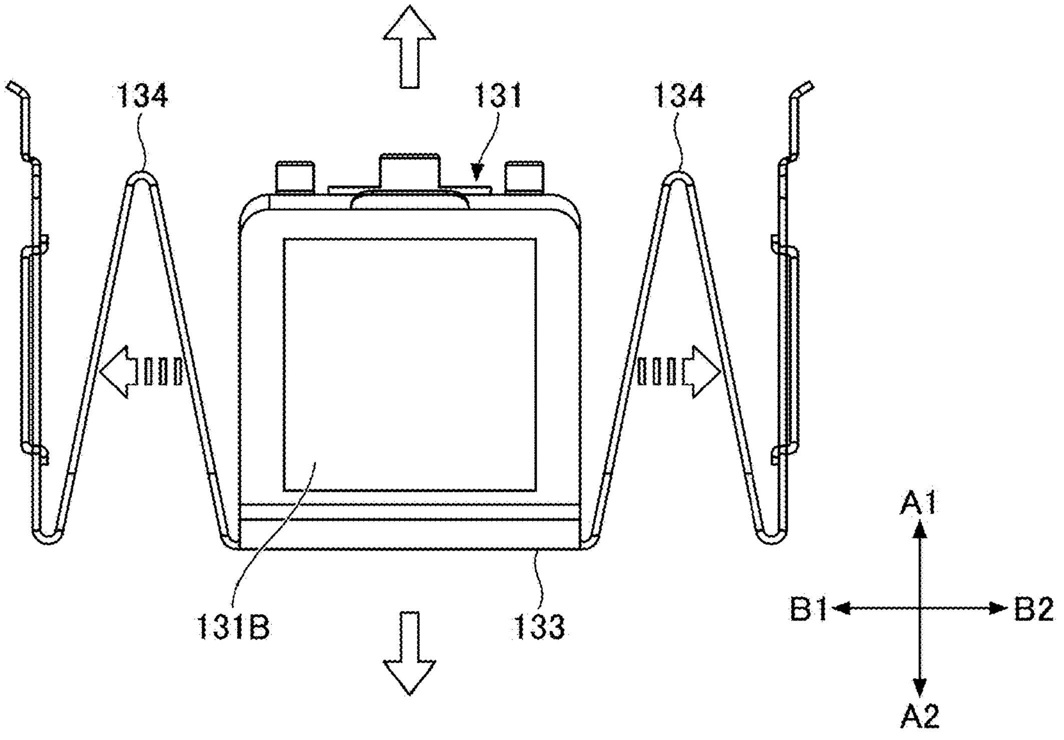
FIG. 10B is a drawing illustrating the vibration direction of the vibrating mass provided in the vibration generator according to the second embodiment.

FIGS. 9A and 9B are drawings illustrating a driving direction of a magnetic drive part provided in the vibration generator 130 according to the second embodiment. FIGS. 10A and 10B are drawings illustrating a vibration direction of the vibrating mass provided in the vibration generator 130 according to the second embodiment.

As described above, the vibration generator 130 has the vibrating mass 131 and the pair of magnets 132 disposed on the housing 135. The vibrating mass 131 generates an alternating magnetic field by an alternating current flowing through the coil 131B, and magnetizes one end and the other end of the magnetic core 131A.

FIGS. 9A and 9B show, as an example, one end of the magnetic core 131A and a magnet 132 facing the one end. As shown in FIGS. 9A and 9B, the magnet 132 has a first magnetization region 132A magnetized to an S-pole and a second magnetization region 132B magnetized to an N-pole on a surface facing one end of the magnetic core 131A, with the first magnetization region 132A and the second magnetization region 132B separated by a diagonal of the rectangular surface.

Then, as shown in FIG. 9A, when one end of the magnetic core 131A is magnetized as an N-pole, the one end of the magnetic core 131A attracts the first magnetization region 132A of the magnet 132 that faces the one end, and repels the second magnetization region 132B of the magnet 132 that also faces the one end. Although not shown, at the same time, the other end of the magnetic core 131A is magnetized as an S-pole, and the other end attracts the first magnetization region 132A of the magnet 132 that faces the other end, and repels the second magnetization region 132B of the magnet 132 that faces the other end. Thus, as shown in FIG. 9A, a magnetic force is applied to the vibrating mass 131 in the left direction (direction B1) and the bottom direction (direction A2) in FIG. 9A.

Also, as shown in FIG. 9B, when one end of the magnetic core 131A is magnetized as an S-pole, the one end of the magnetic core 131A attracts the first magnetization region 132B of the magnet 132 that faces the one end, and repels the second magnetization region 132A of the magnet 132 that also faces the one end. Although not shown, at the same time, the other end of the magnetic core 131A is magnetized as an N-pole, and the other end attracts the first magnetization region 132B of the magnet 132 that faces the other end, and repels the second magnetization region 132A of the magnet 132 that faces the other end. Thus, as shown in FIG. 9B, a magnetic force is applied to the vibrating mass 131 in the right direction (direction B2) and the top direction (direction A1) in FIG. 9B.

The control device 110 can alternately magnetize one end of the magnetic core 131A as an N-pole and an S-pole, and alternately magnetize the other end of the magnetic core 131A as an S-pole and an N-pole by applying an alternating current to the coil 131B. As a result, the magnetic force shown in FIG. 9A and the magnetic force shown in FIG. 9B alternately act on the vibrating mass 131. Therefore, as shown in FIGS. 10A and 10B, the vibrating mass 131 can be vibrated in the top-bottom direction (A1 and A2 direction) and the left-right direction (B1 and B2 direction) in FIGS. 9A and 9B while elastically deforming the pair of elastic supports 134 supporting the vibrating mass 131.

Here, as shown in FIG. 10A, the control device 110 can cause the vibrating mass 131 to undergo a large resonant vibration along the left-right direction (B1 and B2 direction) in FIGS. 10A and 10B by generating an alternating magnetic field with a frequency same as the second natural frequency of the vibrating mass 131 in the vibrating mass 131, by applying an AC with a frequency same as the second natural frequency to the coil 131B.

Additionally, the control device 110 can generate an alternating magnetic field with a frequency same as the first natural frequency of the vibrating mass 131 in the coil 131B as shown in FIG. 10B, and cause the vibrating mass 131 to undergo a large resonant vibration along the top-bottom direction (A1 and A2 direction) in FIGS. 10A and 10B by applying an AC with the driving frequency A (resonance frequency A) same as the first natural frequency to the coil 131B. Therefore, the vibrating mass 131 can selectively vibrate in the A1 and A2 direction or in the B1 and B2 direction with the frequency of the AC current as the first natural frequency or the first natural vibration.

The first natural frequency of the vibrating mass 131 is determined by the first elastic coefficient of the elastic support 134 and the mass of the vibrating mass 131. The second natural frequency of the vibrating mass 131 is determined by the second elastic coefficient of the elastic support 134 and the mass of the vibrating mass 131.

As described above, in the switch unit 100 according to the second embodiment, the vibration generator 130 is an LRA (Linear Resonant Actuator) having two types of frequencies different from each other, driven with two types of driving frequencies A and B different from each other, and capable of resonantly vibrating the vibrating mass 131 in two directions (the first short direction and the second short direction of the external shape of the vibration generator 130) orthogonal to each other.

Thus, the switch unit 100 according to the second embodiment can, for example, be driven at the first driving frequency A to vibrate the touch input part 100B in the left-right direction of the operating surface 100A so that the operator's finger can easily feel the vibration when an input operation to the operating surface 100A is performed, and can be driven at the second driving frequency B to vibrate the touch input part 100B in the top-bottom direction of the operating surface 100A so that the vibration can easily be transmitted to the grips 13L and 13R of the steering wheel 12 when predetermined conditions different from the input operation to the operating surface 100A are satisfied.

That is, in the second embodiment, the first short direction (A1 and A2 direction) is driven at the resonance frequency A so that the resonance vibration is in a direction parallel to the operating surface 100A of the touch input part 100B, and the second short direction (B1 and B2 direction) is driven at the resonance frequency B so that the resonance vibration is in a direction perpendicular to the operating surface 100A of the touch input part 100B. As described above with reference to FIG. 7, a vibration is less likely to be transmitted to the steering wheel 12 when a driving frequency F1 is higher than the resonance frequency F, and more likely to be transmitted to the steering wheel 12 when a driving frequency F2 is lower than the resonance frequency F. Therefore, by causing the driving frequency A to correspond to the higher driving frequency F1 and the driving frequency B to correspond to the lower driving frequency F2, the vibration generated by the vibration generator 130 can be efficiently transmitted to the touch input part 100B and the steering wheel 12 as required. In addition, since the steering wheel 12 has a structure in which the spoke 14 is supported as a cantilever beam, the vibration in the direction perpendicular to the operating surface 100A, that is, in the direction perpendicular to the spoke 14, causes the steering wheel 12 to vibrate more than the vibration in the left-right direction, so that the operator can easily feel the vibration.

(Example of Changing Wave Number of Drive Signal)

Figure 11A:
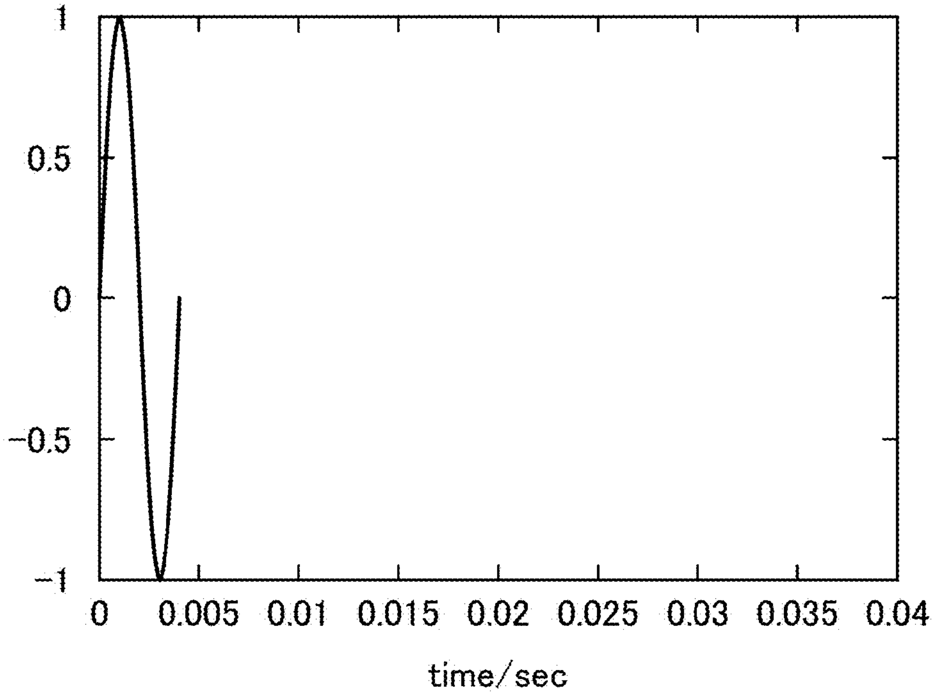
FIG. 11A is a drawing illustrating an example of changing a wave number of a drive signal in the switch unit according to one embodiment.
Figure 11B:
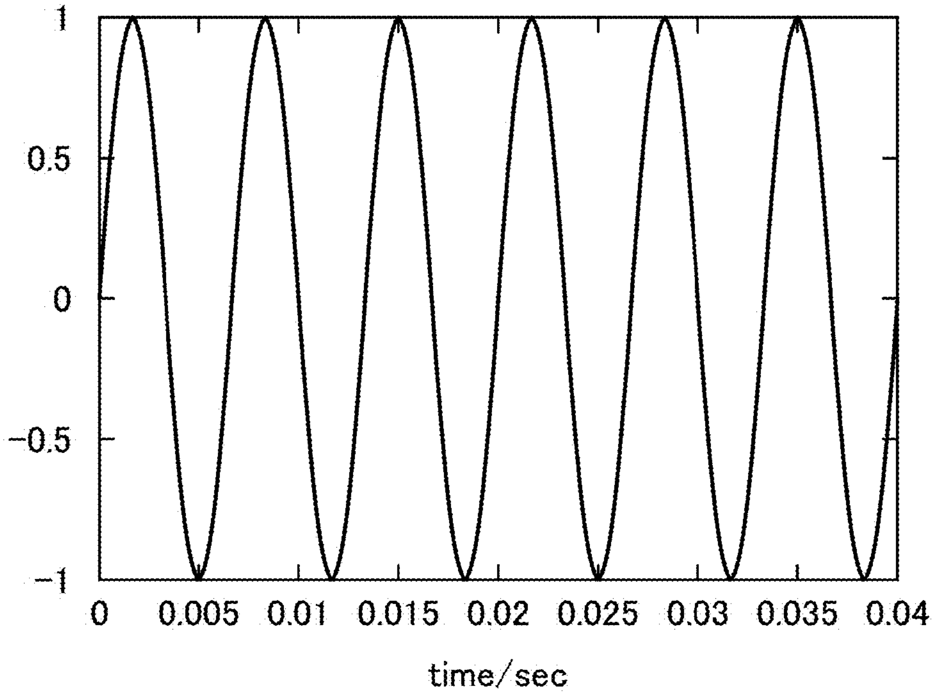
FIG. 11B is a drawing illustrating the example of changing the wave number of the drive signal in the switch unit according to one embodiment.

FIGS. 11A and 11B are drawings illustrating an example of changing a wave number of a drive signal in the switch unit 100 according to one embodiment. The switch unit 100 according to the present embodiment can change a length of the vibration transmitted to the operator's finger or palm by changing the wave number of the drive signal of the current flowing from the control device 110 to the coil 131B.

For example, when an input operation to the operating surface 100A is performed with the operator's finger, as shown in FIG. 11A, a single vibration can be transmitted to the operator's finger by applying a one-cycle drive signal at 250 Hz (driving frequency F1).

When predetermined conditions different from the input operation to the operating surface 100A are satisfied, for example, continuous vibration can be transmitted to the operator's palm by setting the signal waveform of the drive signal at 150 Hz (driving frequency F2) to a plurality of cycles, as shown in FIG. 11B.

In the present embodiment, a structure in which a coil vibrates, or what is called a moving coil type LRA (Linear Resonant Actuator) is used as the vibration generator 130, but this is not limited, and a structure in which a magnet vibrates, or what is called a moving magnet type may be used as the vibration generator 130.

Further, the present t invention is not limited to these embodiments, and various variations and modifications may be made without departing from the scope of the present invention.

What is claimed is:

1. An input device comprising:

a touch input part installed on a steering wheel of a vehicle and supported so as to be able to vibrate;

a detection part configured to detect an input operation to the touch input part;

a vibration output part configured to vibrate the touch input part; and a controller configured to drive the vibration output part, wherein:

when the input operation is detected by the detection part, the controller is configured to cause vibration of the touch input part by driving the vibration output part with a first signal;

a vibration transmission member is provided on a vibration transmission path from the touch input part to the steering wheel; and the first signal is configured to drive the vibration output part at a frequency in a vibration damping region where a resonance multiplying factor of a vibration system provided on the vibration transmission path is less than zero.

2. The input device according to claim 1, wherein the vibration system includes at least the touch input part, the vibration output part, and the vibration transmission member.

3. The input device according to claim 1, wherein:

when a predetermined condition different from the input operation is satisfied, the controller is configured to vibrate the steering wheel via the touch input part by driving the vibration output part with a second signal; and the second signal is configured to drive the vibration output part at a frequency in a vibration amplification region where the resonance multiplying factor of the vibration system including the vibration transmission member is greater than zero.

4. The input device according to claim 3, wherein the controller is configured to drive:

the vibration output part at a resonance frequency of the vibration system or a frequency close to the resonance frequency with the second signal; and the vibration output part at a frequency higher than when the second signal is used, with the first signal.

5. The input device according to claim 1, wherein the vibration output part is configured to output the vibration in a direction parallel to an operating surface of the touch input part.

6. The input device according to claim 1, wherein the vibration output part is an LRA (Linear Resonant Actuator), in which a vibrating mass is capable of resonant vibration, integrally provided on a back surface of the touch input part.

7. The input device according to claim 6, wherein the vibration output part is configured to be driven at two frequencies different from each other such that the vibrating mass vibrates in two directions orthogonal to each other.

* * * * *